United States Patent
Asai et al.

(10) Patent No.: US 12,045,069 B2
(45) Date of Patent: Jul. 23, 2024

(54) UNMANNED AERIAL VEHICLE, CONTROL METHOD, AND RECORDING MEDIUM

(71) Applicant: Panasonic Intellectual Property Management Co., Ltd., Osaka (JP)

(72) Inventors: Katsuhiko Asai, Nara (JP); Kazuo Inoue, Osaka (JP); Kazunobu Konishi, Osaka (JP); Stephen William John, Nara (JP); Shunsuke Kuhara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 426 days.

(21) Appl. No.: 17/316,139

(22) Filed: May 10, 2021

(65) Prior Publication Data
US 2021/0405662 A1 Dec. 30, 2021

Related U.S. Application Data

(63) Continuation of application No. PCT/JP2019/042784, filed on Oct. 31, 2019.

(30) Foreign Application Priority Data

Apr. 18, 2019 (JP) ................................ 2019-079597

(51) Int. Cl.
*G05D 1/00* (2024.01)
*B64C 39/02* (2023.01)
(Continued)

(52) U.S. Cl.
CPC ............. *G05D 1/12* (2013.01); *B64C 39/024* (2013.01); *B64D 47/00* (2013.01); *G05D 1/0094* (2013.01);
(Continued)

(58) Field of Classification Search
CPC ...... G05D 1/12; G05D 1/0094; G05D 1/0808; B64C 39/024; B64D 47/00;
(Continued)

(56) References Cited

U.S. PATENT DOCUMENTS 9,738,381 B1 * 8/2017 Loud .......................... B64B 1/02
2006/0129275 A1 6/2006 Ogawa et al.
(Continued)

FOREIGN PATENT DOCUMENTS

EP 3 926 976 12/2021
JP 2006-167838 6/2006
(Continued)

OTHER PUBLICATIONS

International Search Report issued Jan. 21, 2020 in International (PCT) Application No. PCT/JP2019/042784.
(Continued)

*Primary Examiner* — Ig T An
*Assistant Examiner* — Christine Nguyen Huynh
(74) *Attorney, Agent, or Firm* — Wenderoth, Lind & Ponack, L.L.P.

(57) ABSTRACT

Unmanned aerial vehicle includes a microphone which picks up a sound emitted by a target, an actuator which extends to change a position of the microphone, and a processor. The processor obtains positional relationship information which indicates at least one of a position of the target or a distance from the unmanned aerial vehicle to the target, causes the unmanned aerial vehicle to move to a first position at which the unmanned aerial vehicle and the target have a predetermined positional relationship based on the positional relationship information, and causes actuator to extend toward the target after unmanned aerial vehicle moves to the first position.

14 Claims, 6 Drawing Sheets

(51) Int. Cl.
*B64D 47/00* (2006.01)
*B64U 101/30* (2023.01)
*H04R 1/32* (2006.01)
*H04R 29/00* (2006.01)

(52) U.S. Cl.
CPC ........... *G05D 1/0808* (2013.01); *H04R 1/326* (2013.01); *H04R 29/004* (2013.01); *B64U 2101/30* (2023.01)

(58) Field of Classification Search
CPC ........... B64U 2101/30; B64U 2101/00; B64U 2201/00; B64U 2201/104; B64U 2201/20; H04R 1/326; H04R 29/004; H04R 2201/025; H04R 2410/07; H04R 1/028
See application file for complete search history.

(56) References Cited

U.S. PATENT DOCUMENTS

| | | | |
|---|---|---|---|
| 2006/0143017 A1 | 6/2006 | Sonoura et al. | |
| 2016/0063987 A1* | 3/2016 | Xu | G10K 11/17881 381/71.14 |
| 2017/0220036 A1* | 8/2017 | Visser | G05D 1/0808 |
| 2018/0204585 A1* | 7/2018 | Whittaker | G10L 21/0232 |
| 2018/0315441 A1* | 11/2018 | Sapienza | G10L 25/48 |
| 2020/0150662 A1 | 5/2020 | Zhou et al. | |

FOREIGN PATENT DOCUMENTS

| | | |
|---|---|---|
| JP | 2006-181651 | 7/2006 |
| JP | 2008-126329 | 6/2008 |
| JP | 6167425 | 7/2017 |
| JP | 2019-505047 | 2/2019 |
| WO | 2016/029469 | 3/2016 |
| WO | 2017/131845 | 8/2017 |
| WO | 2019/061860 | 4/2019 |

OTHER PUBLICATIONS

Andrew M. Wilson, et al., "The feasibility of counting songbirds using unmanned aerial vehicles", The Auk: Ornithological Advances, vol. 134, 2017, pp. 350-362.

Extended European Search Report issued May 12, 2022 in European Patent Application No. 19925255.2.

* cited by examiner

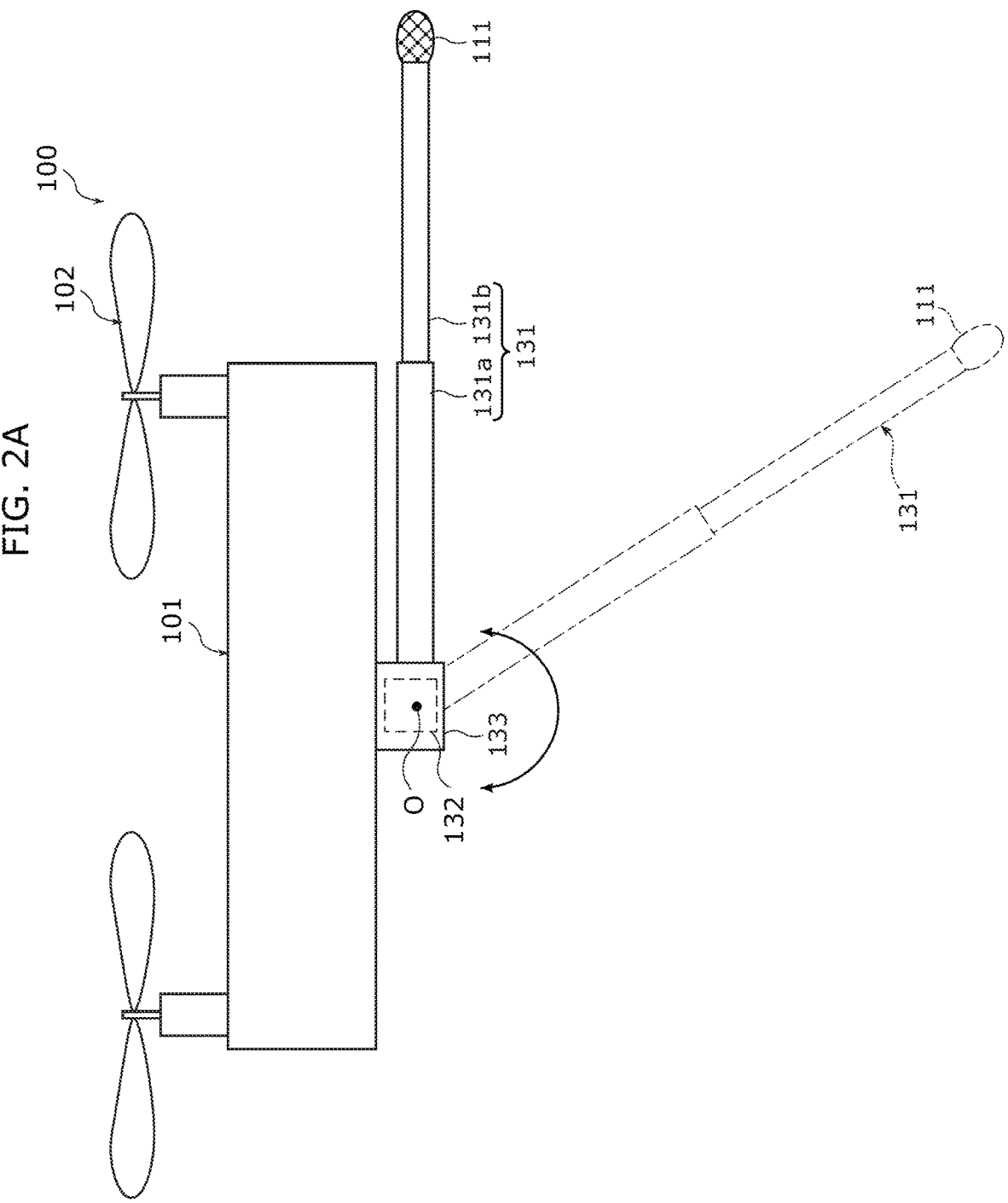

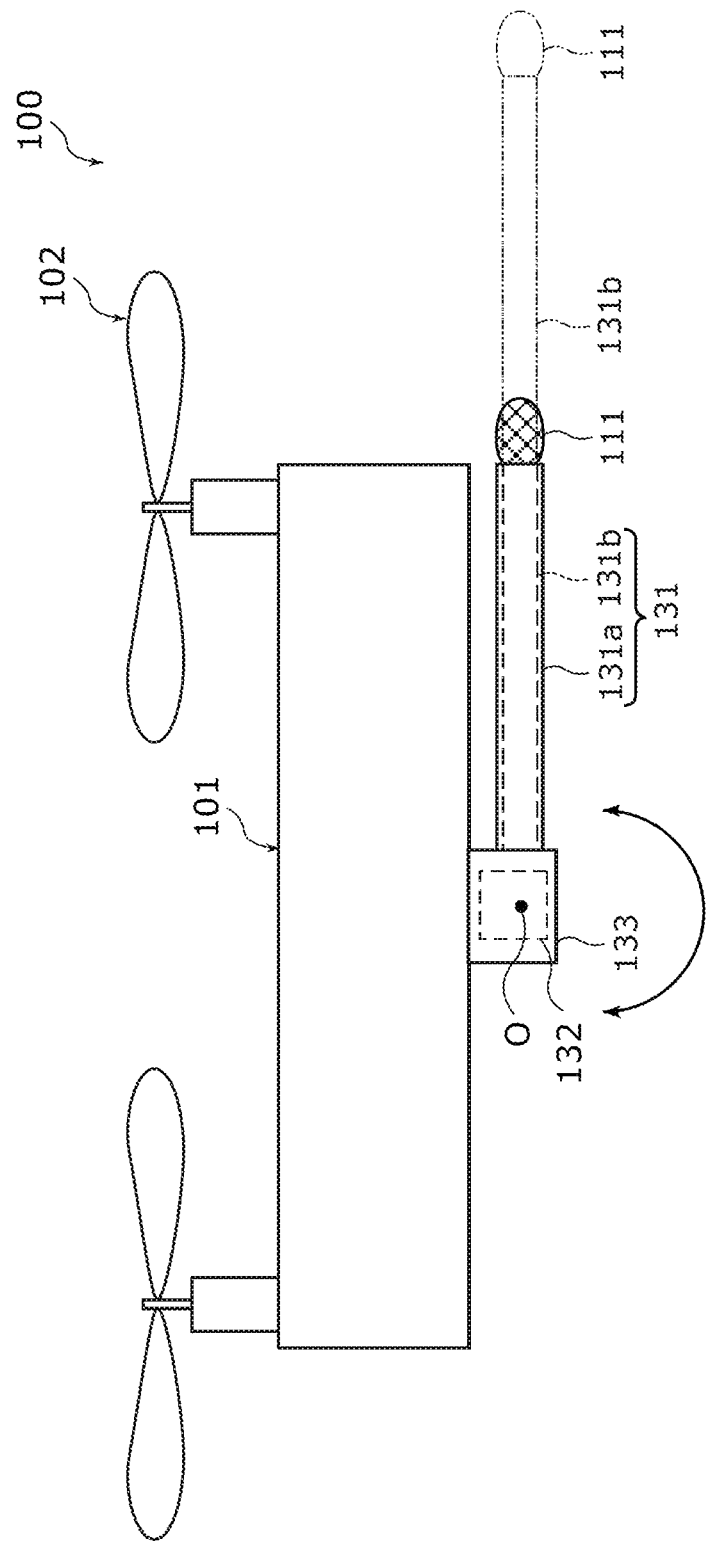

UNMANNED AERIAL VEHICLE, CONTROL METHOD, AND RECORDING MEDIUM

CROSS REFERENCE TO RELATED APPLICATIONS

This is a continuation application of PCT International Application No. PCT/JP2019/042784 filed on Oct. 31, 2019, designating the United States of America, which is based on and claims priority of Japanese Patent Application No. 2019-079597 filed on Apr. 18, 2019. The entire disclosures of the above-identified applications, including the specifications, drawings and claims are incorporated herein by reference in their entirety.

FIELD

The present disclosure relates to an unmanned aerial vehicle, a control method, and a non-transitory computer-readable recording medium having a program recorded thereon using the control method.

BACKGROUND

Patent Literature (PTL) 1 discloses an unmanned aircraft including a sound source collecting microphone which generates audio data of a target sound and a processor which performs processing for reducing background noise in the audio data.

CITATION LIST

Patent Literature

PTL 1: Japanese Patent No. 6167425

SUMMARY

Technical Problem

When sound is picked up by a microphone mounted on an unmanned aerial vehicle, sound generated by the unmanned aerial vehicle, such as wind noise from the propeller or the like of the unmanned aerial vehicle, becomes a problem. In a conventional unmanned aerial vehicle which is an unmanned aircraft, when target sound is picked up, even if the background noise is reduced in the sound picked up by the microphone, the quality of the sound picked up may not be ensured.

Accordingly, it is conceivable to arrange the microphone away from the propeller of the unmanned aerial vehicle such that the sound generated by the unmanned aerial vehicle is not picked up by the microphone. However, in such a case, a mechanism for arranging the microphone away from the propeller is mounted on the unmanned aerial vehicle. As a result, the balance of the unmanned aerial vehicle is less likely to be maintained, which can reduce the flight performance of the unmanned aerial vehicle.

In view of the above, an object of the present disclosure is to provide an unmanned aerial vehicle, a control method, and a non-transitory computer-readable recording medium having a program recorded thereon which are capable of preventing the flight performance of the unmanned aerial vehicle from being reduced while maintaining or improving the quality of the sound picked up by the microphone.

Solution to Problem

For example, an unmanned aerial vehicle according to one aspect of the present disclosure is an unmanned aerial vehicle which includes: a microphone which picks up a sound emitted by a target; an actuator which extends to change a position of the microphone; and a processor. The processor obtains positional relationship information which indicates at least one of a position of the target or a distance from the unmanned aerial vehicle to the target, and the processor causes the unmanned aerial vehicle to move to a first position based on the positional relationship information, and causes the actuator to extend toward the target after the unmanned aerial vehicle moves to the first position, the first position being a position at which the unmanned aerial vehicle and the target have a predetermined positional relationship.

Moreover, for example, a control method according to one aspect of the present disclosure is a control method for controlling an unmanned aerial vehicle including a microphone, an actuator, and a processor, the microphone picking up a sound emitted by a target, the actuator extending to change a position of the microphone, the method being performed by a computer. The method includes: obtaining positional relationship information which indicates at least one of a position of the target or a distance from the unmanned aerial vehicle to the target, and causing the unmanned aerial vehicle to move to a first position based on the positional relationship information, and causing the actuator to extend toward the target after the unmanned aerial vehicle moves to the first position, the first position being a position at which the unmanned aerial vehicle and the target have a predetermined positional relationship.

Moreover, for example, a program according to one aspect of the present disclosure is a non-transitory computer-readable recording medium having a program recorded thereon for causing the computer to execute the control method.

General and specific aspects disclosed above may be implemented using a system, a device, a method, an integrated circuit, a computer program, or a non-transitory computer-readable recording medium such as a CD-ROM, or any combination of systems, devices, methods, integrated circuits, computer programs, or recording media.

Advantageous Effects

The unmanned aerial vehicle and the like according to one aspect of the present disclosure is capable of preventing the flight performance of the unmanned aerial vehicle from being reduced while maintaining or improving the quality of the sound picked up by the microphone.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2A schematically illustrates an example of a state where an arm of an unmanned aerial vehicle according to the embodiment is extended and a state where the arm of the unmanned aerial vehicle is rotated.

FIG. 2B schematically illustrates an example of a state where the arm of the unmanned aerial vehicle according to the embodiment is contracted.

DESCRIPTION OF EMBODIMENT

Figure 1:
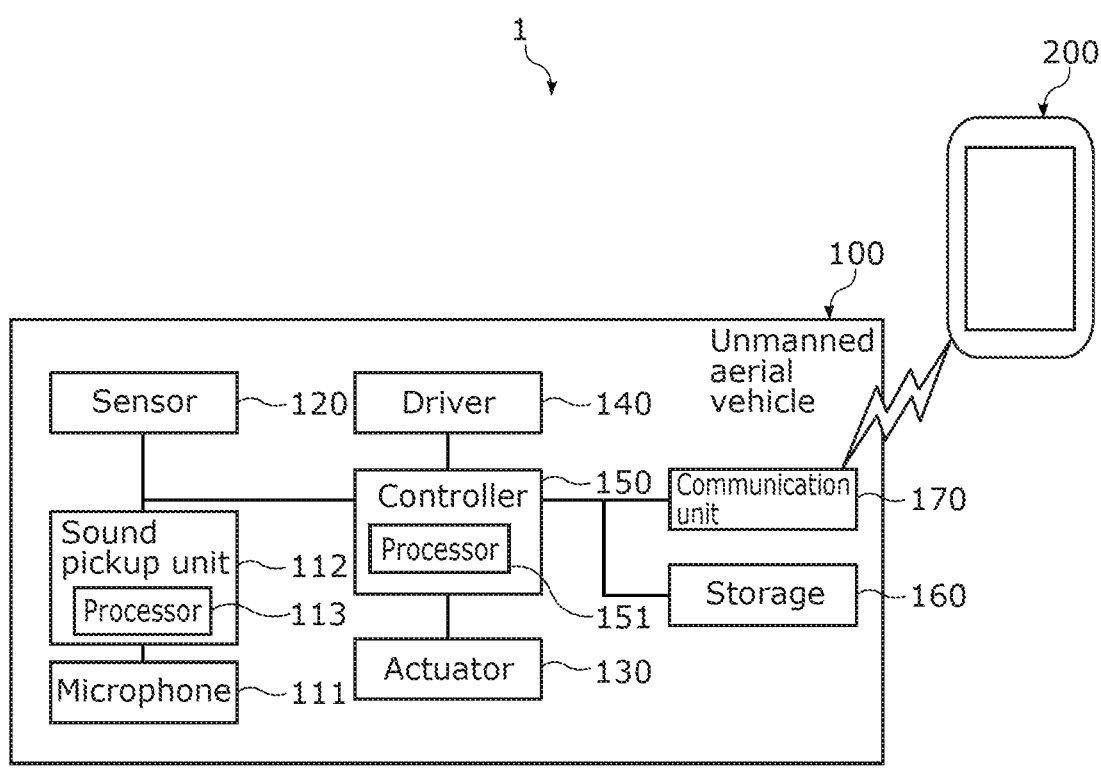
FIG. 1 is a block diagram illustrating a configuration example of an unmanned mobile system according to an embodiment.

For example, an unmanned aerial vehicle according to one aspect of the present disclosure is an unmanned aerial vehicle which includes: a microphone which picks up a sound emitted by a target; an actuator which extends to change a position of the microphone; and a processor. The processor obtains positional relationship information which indicates at least one of a position of the target or a distance from the unmanned aerial vehicle to the target, and the processor causes the unmanned aerial vehicle to move to a first position based on the positional relationship information, and causes the actuator to extend toward the target after the unmanned aerial vehicle moves to the first position, the first position being a position at which the unmanned aerial vehicle and the target have a predetermined positional relationship.

According to the above aspect, the unmanned aerial vehicle moves toward the first position with the actuator not being extended. Hence, the position of the center of gravity of the unmanned aerial vehicle is less likely to deviate from the center of the unmanned aerial vehicle while the unmanned aerial vehicle is moving, and the flight performance is less likely to decrease while the unmanned aerial vehicle is moving. Moreover, the unmanned aerial vehicle is capable of moving the microphone away from the unmanned aerial vehicle by extending the actuator toward the target after arriving at the first position (while hovering), for example. Accordingly, the microphone is less likely to be affected by the sound generated by the unmanned aerial vehicle itself when the microphone picks up the sound. In addition, the sound pickup quality is improved by bringing the microphone closer to the sound pickup target.

Accordingly, the unmanned aerial vehicle is capable of preventing the flight performance of the unmanned aerial vehicle from being reduced during the movement, while maintaining or improving the quality of the sound picked up by the microphone.

Moreover, a control method according to another aspect of the present disclosure is a control method for controlling an unmanned aerial vehicle including a microphone, an actuator, and a processor, the microphone picking up a sound emitted by a target, the actuator extending to change a position of the microphone, the method being performed by a computer. The method includes: obtaining positional relationship information which indicates at least one of a position of the target or a distance from the unmanned aerial vehicle to the target, and causing the unmanned aerial vehicle to move to a first position based on the positional relationship information, and causing the actuator to extend toward the target after the unmanned aerial vehicle moves to the first position, the first position being a position at which the unmanned aerial vehicle and the target have a predetermined positional relationship.

The control method also provides the same advantageous effects as described above.

Moreover, a program according to another aspect of the present disclosure is a non-transitory computer-readable recording medium having a program recorded thereon for causing a computer to execute the control method.

The non-transitory computer-readable recording medium having the program recorded thereon also provides the same advantageous effects as described above.

Moreover, in the unmanned aerial vehicle according to another embodiment of the present disclosure, the processor causes the actuator to extend to an extent that maintains at least a predetermined distance between the target and one of the microphone and the actuator.

According to the above aspect, it is possible to ensure a predetermined distance between the unmanned aerial vehicle and the target such that the unmanned aerial vehicle, that is, the actuator or the microphone does not approach too close to the target. Hence, it is possible to avoid the risk that the actuator or the microphone comes into contact with the target due to the extended actuator or microphone approaching too close to the target.

Moreover, in the unmanned aerial vehicle according to another aspect of the present disclosure, the processor causes the unmanned aerial vehicle to move away from the target according to the extension of the actuator.

According to the above aspect, for example, the body of the unmanned aerial vehicle is moved away from the microphone while keeping the position of the microphone at the first position. Accordingly, the influence of the sound generated by the unmanned aerial vehicle itself when the sound is picked up by the microphone can be further reduced. In other words, the S/N ratio of the sound picked up by the microphone can be improved.

Moreover, in the unmanned aerial vehicle according to another aspect of the present disclosure, the processor identifies a sound pickup quality by using sound data indicating the sound emitted by the target and picked up by the microphone, the sound pickup quality being a quality of the sound picked up by the microphone, and the processor causes the actuator to extend based on the sound pickup quality identified.

In this way, when the sound pickup quality of the microphone is sufficiently satisfied, the extension of the actuator can be stopped to start the sound pickup by the microphone. Moreover, when the sound pickup quality of the microphone is not satisfied, the actuator is further extended to move the microphone away from the unmanned aerial vehicle and bring the microphone closer to the target. Accordingly, the sound pickup quality of the microphone can be ensured more reliably.

Moreover, in the unmanned aerial vehicle according to another aspect of the present disclosure, the processor controls the extension amount of the actuator based on the identified sound pickup quality.

According to the above aspect, by adjusting the amount of extension of the actuator appropriately, the sound pickup quality of the microphone can be ensured more reliably.

Moreover, in the unmanned aerial vehicle according to another aspect of the present disclosure, when the sound pickup quality identified is lower than a goal quality, the processor causes the unmanned aerial vehicle to move to a second position under one of a movement condition and an attitude condition of the unmanned aerial vehicle corresponding to an extension state of the actuator, the second position being a position closer to the target than the first position is.

According to the above aspect, even when the actuator is in the extended state, when the sound pickup quality of the microphone is lower than the goal quality, the unmanned aerial vehicle further approaches the target, so that the sound pickup quality of the microphone can be ensured more reliably.

Moreover, in the unmanned aerial vehicle according to another aspect of the present disclosure, the processor instructs the target to increase a sound volume when the sound pickup quality identified is lower than the goal quality.

According to the above aspect, the target is prompted to increase the sound volume, so that the target emits a louder sound. In this case, the unmanned aerial vehicle is capable of more reliably ensuring the sound pickup quality of the microphone.

Moreover, the unmanned aerial vehicle according to another embodiment of the present disclosure further includes an image sensor which captures an image of the target. The processor obtains the positional relationship information by using image data captured by the image sensor, the image data including the image of the target.

With this, the processor is capable of obtaining information indicating an accurate position. Hence, the positional relationship between the target and the unmanned aerial vehicle, in other words, the distance from the unmanned aerial vehicle to the target can be appropriately maintained. As a result, the unmanned aerial vehicle is capable of more reliably ensuring the sound pickup quality of the microphone.

Moreover, the unmanned vehicle according to another aspect of the present disclosure further includes: a ranging sensor which measures a distance to the target. The processor obtains the positional relationship information by using distance data which indicates the distance to the target measured by the ranging sensor.

In such a case, too, the same advantageous effects as described above can be provided.

Hereinafter, an embodiment will be specifically described with reference to the drawings. It should be noted that the embodiment described below shows a general or specific example. The numerical values, shapes, materials, structural elements, arrangement positions and connection forms of the structural elements, steps, the order of steps, etc. shown in the following embodiment are examples, and are not intended to limit the scope of claims. Moreover, among the structural elements in the embodiment below, the structural elements not described in independent claims will be described as arbitrary structural elements.

Note that the respective figures are schematic diagrams and are not necessarily precise illustrations. Additionally, the structural elements that are essentially the same share like reference numerals in the respective figures, and overlapping explanations thereof are omitted or simplified.

Hereinafter, an unmanned aerial vehicle, a control method, and a non-transitory computer-readable recording medium having a program recorded thereon according to an embodiment of the present disclosure will be described.

Embodiment

[Configuration: Unmanned Mobile System 1]

FIG. 1 is a block diagram illustrating a configuration example of unmanned mobile system 1 according to an embodiment.

As illustrated in FIG. 1, unmanned mobile system 1 is a system which includes unmanned aerial vehicle 100 and remote control device 200 which remotely controls unmanned aerial vehicle 100 in a wireless manner. Unmanned mobile system 1 is a system in which when remote control device 200 receives an input, remote control device 200 causes unmanned aerial vehicle 100 to move toward the target, and after unmanned aerial vehicle 100 arrives near the target, causes unmanned aerial vehicle 100 to pick up the sound emitted by the target. The term "target" here refers to a person, an animal, an audio device, a device which emits sound, and the like. Moreover, the sound to be picked up is not limited to human voice, but also includes, for example, sound emitted by a device.

[Unmanned Aerial Vehicle 100]

Unmanned aerial vehicle 100 is a device that flies. For example, when remote control device 200 receives an operation, unmanned aerial vehicle 100 flies according to the operation received by remote control device 200. Specifically, unmanned aerial vehicle 100 flies, stops, lands and the like according to the operation. Unmanned aerial vehicle 100 is also capable of flying autonomously. Such unmanned aerial vehicle 100 includes a motor for moving in the air and a movement mechanism, such as propeller 102.

Unmanned aerial vehicle 100 also includes microphone 111, sound pickup unit 112, sensor 120, driver 140, actuator 130, controller 150, storage 160, and communication unit 170.

<Microphone 111>

Microphone 111 is a sound sensor capable of picking up the sound emitted by the target. Microphone 111 includes a voice coil, a diaphragm which vibrates the voice coil, a magnetic circuit unit that forms a magnetic field passing through the voice coil, and the like. After microphone 111 picks up the sound emitted by the target, microphone 111 converts the picked sound into a sound signal, and outputs the converted sound signal to sound pickup unit 112.

Moreover, microphone 111 may have directivity. In this case, when the directivity of microphone 111 is directed to the target, microphone 111 is capable of preventing the sound other than the sound emitted by the target from being picked up. Accordingly, the sound pickup quality of microphone 111 can be improved. The direction of the directivity of microphone 111 may also be adjusted to a desired direction by sound pickup unit 112.

<Sound Pickup Unit 112>

Sound pickup unit 112 includes processor 113 for identifying the sound pickup quality which is the quality of the sound of the sound signal obtained by microphone 111. Processor 113 is a circuit which performs information processing. Sound pickup unit 112 identifies the sound pickup quality which is the quality of the sound indicated by the sound signal, and outputs quality information indicating the identified sound pickup quality to controller 150.

<Sensor 120>

Sensor 120 is an image sensor which captures an image of a target, or a ranging sensor which measures a distance to the target. Controller 150 obtains data from the image sensor or the ranging sensor. When sensor 120 is an image sensor, the image sensor generates image data (an example of detection data) of the captured target, and outputs the generated image data to controller 150.

When sensor 120 is a ranging sensor, the ranging sensor generates distance data (an example of detection data) in which the distance to the target is measured, and outputs the generated distance data to controller 150. Such detection data includes positional relationship information which indicates at least one of the position of the target with respect to unmanned aerial vehicle 100 or the distance from unmanned aerial vehicle 100 to the target, and information indicating the target.

In addition to sensor 120, unmanned aerial vehicle 100 further includes an acceleration sensor, a gyroscope sensor, a pressure sensor, a geomagnetic sensor, a global positioning system (GPS) receiver, and the like. The acceleration sensor is a sensor which obtains the acceleration of unmanned aerial vehicle 100. The gyroscope sensor is a sensor which obtains the acceleration of unmanned aerial vehicle 100. The pressure sensor is a sensor which obtains the attitude of unmanned aerial vehicle 100 by detecting the atmospheric pressure around unmanned aerial vehicle 100. The geomagnetic sensor is a sensor capable of obtaining the direction in which unmanned aerial vehicle 100 moves. The GPS receiver is a receiver which obtains the position of unmanned aerial vehicle 100 by receiving a signal.

<Driver 140>

Driver 140 is a motor which moves unmanned aerial vehicle 100 and a movement mechanism, such as propeller 102. When driver 140 obtains a movement control signal (to be described later) generated by controller 150, driver 140 controls the movement of unmanned aerial vehicle 100 by controlling the movement mechanism according to the movement control signal.

<Actuator 130>

Actuator 130 will be described with reference to FIG. 2A and FIG. 2B.

FIG. 2A schematically illustrates an example of a state where arm 131 of unmanned aerial vehicle 100 according to the embodiment is extended and a state where arm 131 is rotated. FIG. 2B schematically illustrates an example of a state where arm 131 of unmanned aerial vehicle 100 according to the embodiment is contracted.

As illustrated in FIG. 2A and FIG. 2B, actuator 130 includes arm 131 and motor 132.

Arm 131 is arranged on body 101 of unmanned aerial vehicle 100, and can be extended and contracted with respect to body 101. Arm 131 in the present embodiment has a long rod-shaped structure. Arm 131 is adjusted and fixed to a predetermined length by motor 132. Arm 131 in the present embodiment includes tubular first arm 131a and tubular second arm 131b having a diameter smaller than that of first arm 131a.

One end of first arm 131a is fixed to hinge portion 133 of body 101 of unmanned aerial vehicle 100. The one end of first arm 131a can be rotated about axis O by hinge portion 133 (indicated by a thick solid line and dashed two-dotted line). Moreover, first arm 131a is capable of housing second arm 131b.

At least part of second arm 131b is housed inside first arm 131a. In other words, second arm 131b is housed in first arm 131a with a nested structure. Moreover, second arm 131b can be extended from the other end side of first arm 131a. One end side of second arm 131b is supported in an extendable manner with respect to first arm 131a, and the other end side of second arm 131b supports microphone 111. As illustrated in FIG. 2B, second arm 131b can be extended and contracted with respect to body 101 of unmanned aerial vehicle 100 by sliding with respect to first arm 131a.

The amount of slide that second arm 131b slides with respect to first arm 131a is controlled by motor 132 of actuator 130. Although two arms, which are first arm 131a and second arm 131b, are illustrated as arm 131, arm 131 may include three or more arms 131.

Although an example of arm 131 has been illustrated, the present disclosure is not limited to such an example. Arm 131 may have a foldable structure in which arm 131 can be contracted by second arm 131b being folded with respect to first arm 131a or second arm 131b can be extended. Arm 131 may have a known configuration as long as arm 131 can be extended with respect to body 101.

<Controller 150>

As illustrated in FIG. 1 and FIG. 2B, controller 150 includes processor 151, and includes a circuit which performs information processing. By controlling driver 140, controller 150 controls the movement of unmanned aerial vehicle 100 and controls the extension amount for extending arm 131 of actuator 130.

Figure 3A:
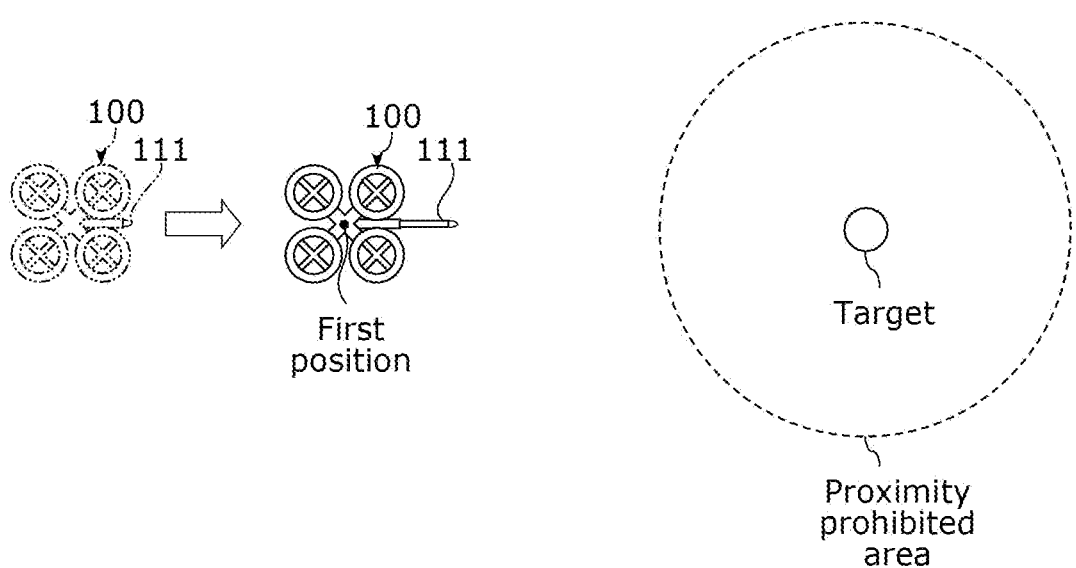
FIG. 3A schematically illustrates an example of a state where the unmanned aerial vehicle according to the embodiment approaches a target to a first position.

FIG. 3A schematically illustrates an example of a state where unmanned aerial vehicle 100 according to the embodiment approaches the target to a first position.

As illustrated in FIG. 1 and FIG. 3A, controller 150 causes unmanned aerial vehicle 100 to move to a first position based on data obtained from sensor 120, the acceleration sensor, the gyroscope sensor, the pressure sensor, the geomagnetic sensor, the GPS receiver, and the like. Specifically, controller 150 uses the data obtained from sensor 120 and the like to obtain positional relationship information which indicates at least one of the position of the target with respect to unmanned aerial vehicle 100 (information indicating the position) or the distance from unmanned aerial vehicle 100 to the target (information indicating the distance). Controller 150 generates a movement control signal based on the position of the target with respect to unmanned aerial vehicle 100 or the distance from unmanned aerial vehicle 100 to the target, and outputs the generated movement control signal to driver 140, so as to control the movement of unmanned aerial vehicle 100. In the present embodiment, controller 150 controls the flight of unmanned aerial vehicle 100 via driver 140. When unmanned aerial vehicle 100 moves toward the first position, controller 150 causes driver 140 to stop unmanned aerial vehicle 100 at the first position. For example, unmanned aerial vehicle 100 flies while remaining at the first position (also referred to as hovering).

As illustrated in FIG. 1 and FIG. 3A, when controller 150 causes unmanned aerial vehicle 100 to start moving to the first position and to hover unmanned aerial vehicle 100 at the first position, controller 150 generates an extension control signal for extending arm 131 of actuator 130, and outputs the generated extension control signal to actuator 130. Specifically, controller 150 controls the flight of unmanned aerial vehicle 100 such that microphone 111 arranged on arm 131 of actuator 130 is directed toward the target. The control for extending actuator 130 after the movement to the first position includes, other than the described control after the arrival at the first position, the control during the movement to the first position.

Controller 150 also controls the extension of actuator 130. When arm 131 is extended, controller 150 causes unmanned aerial vehicle 100 to move away from the target according to the extension of actuator 130. In other words, at the same time as when controller 150 extends arm 131 of actuator 130, or after controller 150 extends arm 131 of actuator 130, controller 150 controls the movement of unmanned aerial vehicle 100 such that body 101 of unmanned aerial vehicle 100 is moved away from the target. Accordingly, body 101 moves away from microphone 111.

Moreover, after controller 150 extends arm 131, controller 150 generates a sound pickup signal for starting picking up sound in order to check the sound pickup quality of microphone 111, and outputs the generated sound pickup signal to microphone 111 via sound pickup unit 112. As a result, sound pickup unit 112 causes microphone 111 to start picking up sound.

Here, the sound pickup quality refers to the quality (sound pressure, etc.) of the sound picked up by microphone 111, and indicates the level of the sound picked up with respect to the noise level of the sound picked up. The sound pickup performed by microphone 111 includes picking up the sound emitted by the target for checking the sound pickup quality and picking up the sound emitted by the target when the sound pickup quality can ensure the goal quality. In either case, microphone 111 starts picking up sound, generates sound data indicating the sound emitted by the target, and outputs the generated sound data to sound pickup unit 112. When checking the sound pickup quality, sound pickup unit 112 identifies the sound pickup quality of the obtained sound data, compares the identified sound pickup quality with the goal quality, and determines whether or not the identified sound pickup quality satisfies the goal quality.

When the identified sound pickup quality is higher than or equal to the goal quality, sound pickup unit 112 causes microphone 111 to start picking up sound. On the other hand, when the identified sound pickup quality is lower than the goal quality, sound pickup unit 112 outputs information indicating the determination result (result indicating that the sound pickup quality is lower than the goal quality) to controller 150 to extend arm 131 of actuator 130. When controller 150 obtains the information indicating the determination result, controller 150 determines whether or not arm 131 of actuator 130 has reached the extendable limit.

Figure 3B:
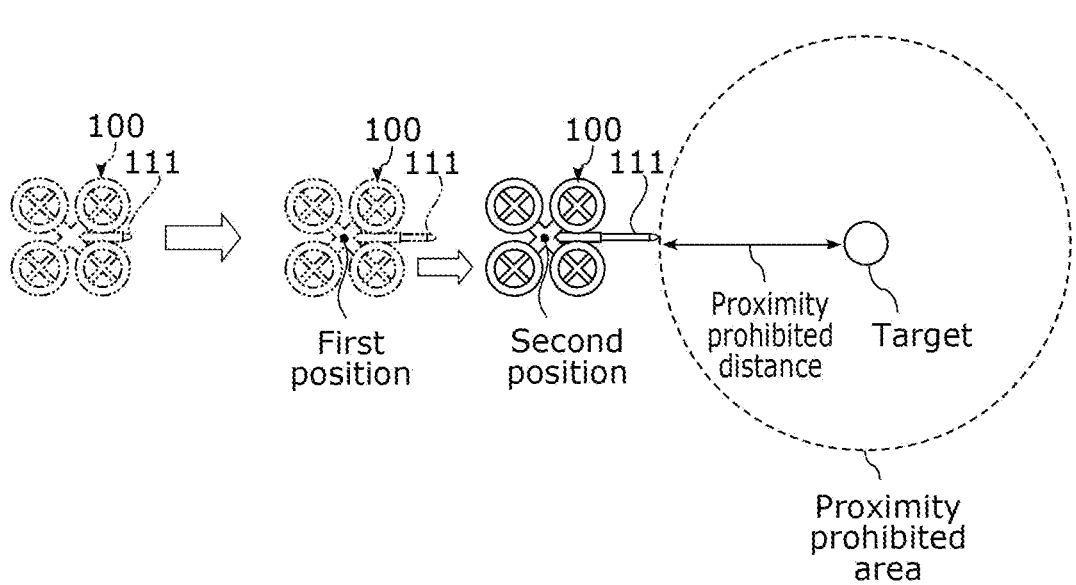
FIG. 3B schematically illustrates an example of a state where the unmanned aerial vehicle according to the embodiment approaches the target from the first position to a second position.

As illustrated in FIG. 1 and FIG. 3B, when arm 131 of actuator 130 has not reached the extendable limit, controller 150 causes actuator 130 to extend arm 131 of actuator 130. In other words, controller 150 determines the extension amount of actuator 130 based on the identified sound pickup quality, and controls the extension state of actuator 130 according to the determined extension amount. For example, controller 150 determines the extension amount of actuator 130 by using a table in which the extension amount of actuator 130 is predetermined according to the sound pickup quality. The extension control signal includes information indicating the extension amount for extending arm 131 of actuator 130. When actuator 130 obtains the extension control signal, actuator 130 extends arm 131 by the extension amount corresponding to the extension control signal to relatively change the position of microphone 111 with respect to body 101.

When arm 131 of actuator 130 has reached the extendable limit, controller 150 cannot extend arm 131 of actuator 130. In this case, as illustrated in FIG. 3B, controller 150 causes unmanned aerial vehicle 100 to move to a second position based on the position of the target with respect to unmanned aerial vehicle 100 or the distance from unmanned aerial vehicle 100 to the target. The second position is a position which is closer to the target than the first position is. FIG. 3B schematically illustrates an example of a state where unmanned aerial vehicle 100 according to the embodiment approaches the target from the first position to the second position. Specifically, controller 150 generates a movement control signal based on the position of the target with respect to unmanned aerial vehicle 100 or the distance from unmanned aerial vehicle 100 to the target. Controller 150 then outputs the generated movement control signal to driver 140 to control the movement of unmanned aerial vehicle 100. Here, unmanned aerial vehicle 100 moves from the first position to the second position. Controller 150 controls driver 140 such that unmanned aerial vehicle 100 stops at the second position. As a result, unmanned aerial vehicle 100 hovers at the second position.

When unmanned aerial vehicle 100 moves from the first position to the second position, controller 150 controls driver 140 such that unmanned aerial vehicle 100 moves from the first position to the second position under the movement condition or the attitude condition of unmanned aerial vehicle 100 corresponding to the extension state of actuator 130. When unmanned aerial vehicle 100 moves from the first position to the second position, unmanned aerial vehicle 100 moves with arm 131 of actuator 130 being extended. The moving speed at this time is determined according to the extension state of arm 131. In other words, controller 150 determines the moving speed such that the moving speed decreases as the extension amount of arm 131 increases. The moving speed when unmanned aerial vehicle 100 moves from the first position to the second position is less than the moving speed when unmanned aerial vehicle 100 moves toward the first position, and is, for example, about several kilometers per hour.

Here, the movement condition of unmanned aerial vehicle 100 is, for example, a condition for controlling the moving speed, acceleration, movement distance, etc. of unmanned aerial vehicle 100 when moving from the first position to the second position. The attitude condition of unmanned aerial vehicle 100 is a condition for controlling the inclination of body 101 of unmanned aerial vehicle 100 with respect to the horizontal direction. For example, when unmanned aerial vehicle 100 moves horizontally, unmanned aerial vehicle 100 moves with the attitude of body 101 of unmanned aerial vehicle 100 being inclined. Hence, the amount of inclination of body 101 correlates with the moving speed of unmanned aerial vehicle 100, and can be replaced with the moving speed of unmanned aerial vehicle 100. For example, as the amount of inclination of body 101 increases, the moving speed of unmanned aerial vehicle 100 also increases.

Controller 150 obtains information indicating a proximity prohibited distance which is the limit of the distance at which unmanned aerial vehicle 100 is allowed to approach the target. Moreover, controller 150 changes the position of microphone 111 by extending actuator 130 based on the information indicating the proximity prohibited distance. In other words, the position of microphone 111 is changed by controlling the extension amount of arm 131 of actuator 130 such that the position of microphone 111 is outside the proximity prohibited area defined by the proximity prohibited distance. In the present embodiment, controller 150 obtains information indicating the proximity prohibited distance from storage 160. However, controller 150 may obtain the information from remote control device 200. In the case where communication unit 170 also serves as an input unit, controller 150 may obtain the information from communication unit 170.

Controller 150 determines whether or not unmanned aerial vehicle 100 has reached the position where the distance from the target is the proximity prohibited distance. In other words, controller 150 determines whether or not unmanned aerial vehicle 100 has reached the boundary of the proximity prohibited area. Specifically, controller 150 determines whether or not part of unmanned aerial vehicle 100 with actuator 130 being extended has reached the boundary of the proximity prohibited area. When part of unmanned aerial vehicle 100 has reached the boundary of the proximity prohibited area, controller 150 stops unmanned aerial vehicle 100.

Note that controller 150 may extend actuator 130 after unmanned aerial vehicle 100 reaches the boundary of the proximity prohibited area. In such a case, controller 150 moves unmanned aerial vehicle 100 such that unmanned aerial vehicle 100 does not enter the proximity prohibited area by extending actuator 130. Specifically, when controller 150 extends arm 131 of actuator 130 and actuator 130 or microphone 111 may enter the proximity prohibited area, controller 150 extends arm 131 and simultaneously retracts unmanned aerial vehicle 100 in the direction opposite to the extension direction of arm 131.

Moreover, the orientation of arm 131 may be changed by controlling hinge portion 133 (FIG. 2B) of actuator 130 or driver 140 such that unmanned aerial vehicle 100 is positioned outside the proximity prohibited area. As a result, unmanned aerial vehicle 100 is moved, so that unmanned aerial vehicle 100 is unlikely to enter the proximity prohibited area, and unmanned aerial vehicle 100 is positioned outside the proximity prohibited area. Whether or not unmanned aerial vehicle 100 has reached the position where the distance from the target is the proximity prohibited distance may be determined by controller 150 based on, for example, the positional relationship information detected by sensor 120.

When unmanned aerial vehicle 100 has reached the position where the distance from the target is the proximity prohibited distance, controller 150 generates a sound pickup signal for causing microphone 111 to start picking up sound, and outputs the generated sound pickup signal to microphone 111 via sound pickup unit 112. The sound pickup performed by microphone 111 here is a sound pickup for checking the sound pickup quality of the sound emitted by the target. In this case, too, after microphone 111 outputs the generated sound data to sound pickup unit 112, sound pickup unit 112 identifies the sound pickup quality, and determines whether or not the identified sound pickup quality satisfies the goal quality.

When the identified sound pickup quality is higher than or equal to the goal quality, sound pickup unit 112 causes microphone 111 to start picking up sound. Here, sound pickup unit 112 causes microphone 111 to start picking up sound to pick up the sound emitted by the target. In such a manner, microphone 111 picks up the sound with a quality higher than or equal to the goal quality.

Note that sound pickup unit 112 may present information indicating that the sound pickup quality is sufficient, when the identified sound pickup quality is higher than or equal to the goal quality. For example, when unmanned aerial vehicle 100 includes a display unit, a loudspeaker, or the like, sound pickup unit 112 may present via the display unit or the loudspeaker that the sound pickup quality is sufficient. Moreover, sound pickup unit 112 may transmit information indicating that the sound pickup quality is sufficient to remote control device 200 via communication unit 170.

Moreover, when the identified sound pickup quality is lower than the goal quality, sound pickup unit 112 instructs the target to increase the sound volume. For example, when the target is a person and unmanned aerial vehicle 100 includes a loudspeaker, sound pickup unit 112 may output, to the loudspeaker, an instruction prompting to increase the sound volume by voice. Moreover, for example, when the target is a device, a control command prompting the device to increase the sound volume may be transmitted to the device via communication unit 170. By doing so, the target emits a louder sound.

<Storage 160>

Storage 160 is a memory for storing information, such as control parameters of actuator 130, an upper limit value of the moving speed of unmanned aerial vehicle 100, information indicating a proximity prohibited distance, and information about the positional relationship of microphone 111 with respect to body 101. The control parameters are, for example, information indicating the extension amount of arm 131 of actuator 130. The upper limit value of the moving speed is, for example, the upper limit value of the speed of the movement from the first position to the second position. The position of microphone 111 is a relative distance to main body 101.

<Communication Unit 170>

Communication unit 170 is a communication device which communicates with remote control device 200 which is a device external to unmanned aerial vehicle 100. Communication unit 170 receives target information indicating a sound pickup target from remote control device 200, and outputs the received target information to controller 150. Communication unit 170 may receive an operation signal for moving unmanned aerial vehicle 100 from remote control device 200.

Moreover, when the identified sound pickup quality is higher than or equal to the goal quality, communication unit 170 may transmit, to remote control device 200, information indicating that the sound pickup quality is sufficient.

[Remote Control Device 200]

Remote control device 200 is an operation terminal which receives an operation for inputting target information indicating the sound pickup target. Remote control device 200 may transmit, to unmanned aerial vehicle 100, an operation signal for operating the movement of unmanned aerial vehicle 100.

Moreover, when remote control device 200 receives information indicating that the sound pickup quality is sufficient, remote control device 200 may display, on the display unit of remote control device 200, that the sound pickup quality is sufficient.

[Operation]

Figure 4:
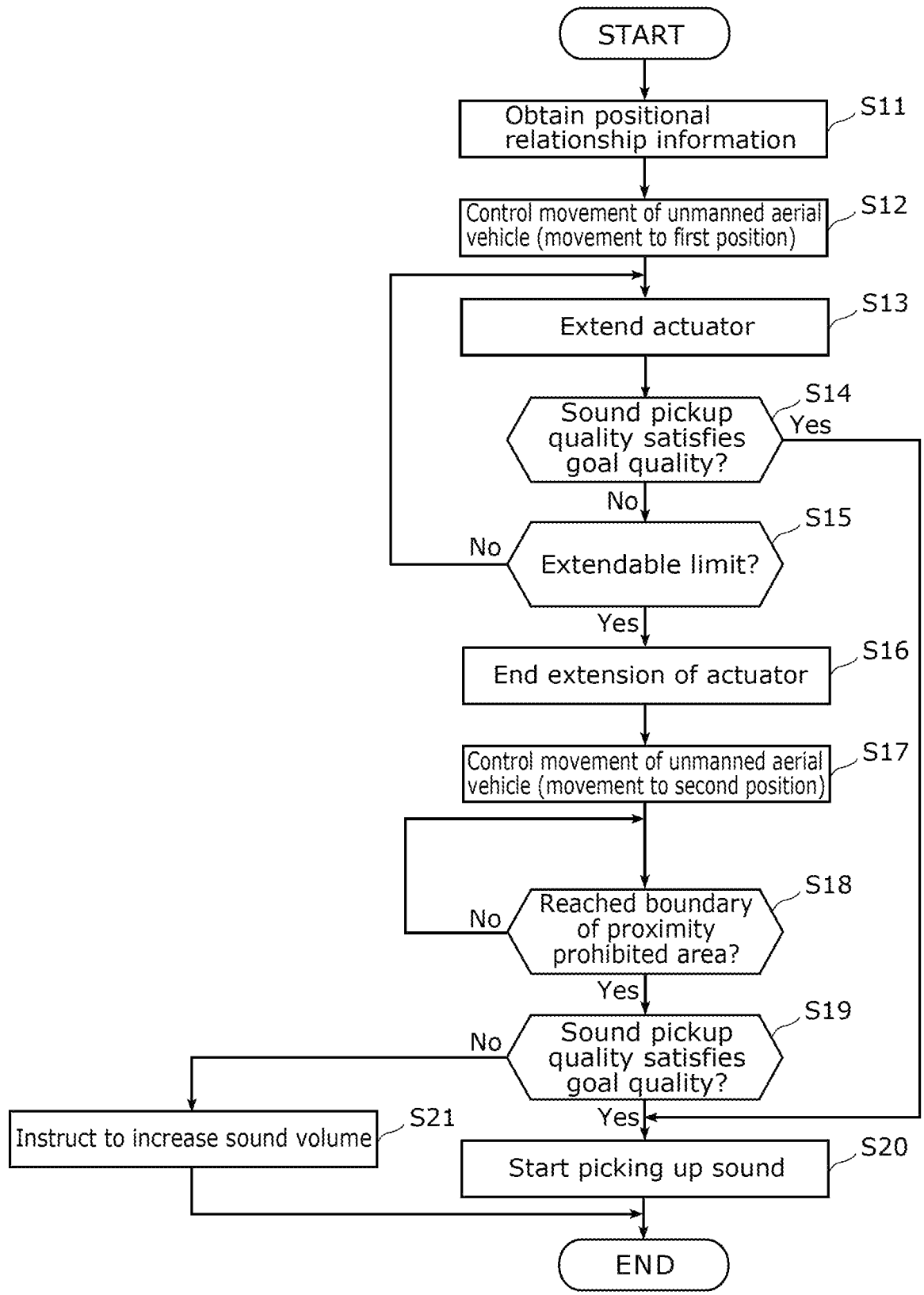
FIG. 4 is a flowchart showing an operation of the unmanned aerial vehicle according to the embodiment.

FIG. 4 is a flowchart showing an operation of unmanned aerial vehicle 100 according to the embodiment.

As illustrated in FIG. 1 and FIG. 4, sensor 120 obtains the relative positional relationship information of the target with respect to unmanned aerial vehicle 100 (S11).

Sensor 120 is, for example, an image sensor which captures an image of the target or a ranging sensor which detect the target. When sensor 120 is an image sensor, sensor 120 generates image data of the target, and outputs the generated image data to controller 150. The image data includes, for example, positional relationship information which indicates at least one of the position of the target with respect to unmanned aerial vehicle 100 or the distance from unmanned aerial vehicle 100 to the target, and information indicating the target. When sensor 120 is a ranging sensor, sensor 120 generates detection data of the target, and outputs the generated detection data to controller 150. The detection data includes, for example, positional relationship information which indicates at least one of the position of the target with respect to unmanned aerial vehicle 100 or the distance from unmanned aerial vehicle 100 to the target, and information indicating the target.

As illustrated in FIG. 1, FIG. 3A, and FIG. 4, controller 150 causes unmanned aerial vehicle 100 to move toward the first position, based on at least one of the position of the target with respect to unmanned aerial vehicle 100 and the distance from unmanned aerial vehicle 100 to the target, which is indicated by the positional relationship information obtained from sensor 120 (S12). Specifically, controller 150 calculates the position of the target with respect to unmanned aerial vehicle 100 or the distance from unmanned aerial vehicle 100 to the target, which is indicated by the data obtained from sensor 120. Controller 150 determines the first position at which unmanned aerial vehicle 100 and the target have a predetermined positional relationship, according to the calculated target position or distance to the target. Controller 150 controls the movement of unmanned aerial vehicle 100 by generating a movement control signal based on the determined first position and outputting the generated movement control signal to driver 140. Controller 150 controls the flight of unmanned aerial vehicle 100 such that unmanned aerial vehicle 100 moves toward the first position.

When unmanned aerial vehicle 100 arrives at the first position, controller 150 generates a stop control signal for stopping at the first position, and outputs the generated stop control signal to driver 140 to stop unmanned aerial vehicle 100. Unmanned aerial vehicle 100 hovers at the first position.

Next, after unmanned aerial vehicle 100 arrives at the first position, controller 150 generates an extension control signal for extending arm 131 of actuator 130, and outputs the generated extension control signal to actuator 130. Specifically, controller 150 determines the extension amount of actuator 130, and controls the extension of actuator 130 according to the determined extension amount. In other words, controller 150 changes the position of microphone 111 by extending actuator 130. Controller 150 may set the extension amount according to the calculated position of the target with respect to unmanned aerial vehicle 100 or the distance from unmanned aerial vehicle 100 to the target. Controller 150 generates an extension control signal according to the set extension amount, and outputs the generated extension control signal to actuator 130. When actuator 130 obtains the extension control signal, actuator 130 extends arm 131 of actuator 130 by the extension amount corresponding to the extension control signal (S13).

Next, when arm 131 is extended, controller 150 causes microphone 111 to start picking up sound via sound pickup unit 112. Specifically, controller 150 generates a sound pickup signal for causing microphone 111 to start picking up sound, and outputs the generated sound pickup signal to sound pickup unit 112. When sound pickup unit 112 obtains the sound pickup signal, sound pickup unit 112 causes microphone 111 to start picking up sound based on the sound pickup signal, so that microphone 111 picks up the sound for a certain period of time. The sound pickup performed by microphone 111 here is a sound pickup for checking the sound pickup quality of the sound emitted by the target. Microphone 111 starts picking up sound, generates sound data indicating the sound emitted by the target, and outputs the generated sound data to sound pickup unit 112. When checking the sound pickup quality, sound pickup unit 112 identifies the sound pickup quality of the obtained sound data, compares the identified sound pickup quality with the goal quality, and determines whether or not the identified sound pickup quality satisfies the goal quality (S14). For example, sound pickup unit 112 identifies the sound pickup quality based on the sound pressure, sound quality and the like indicated by the sound data.

Figure 5:
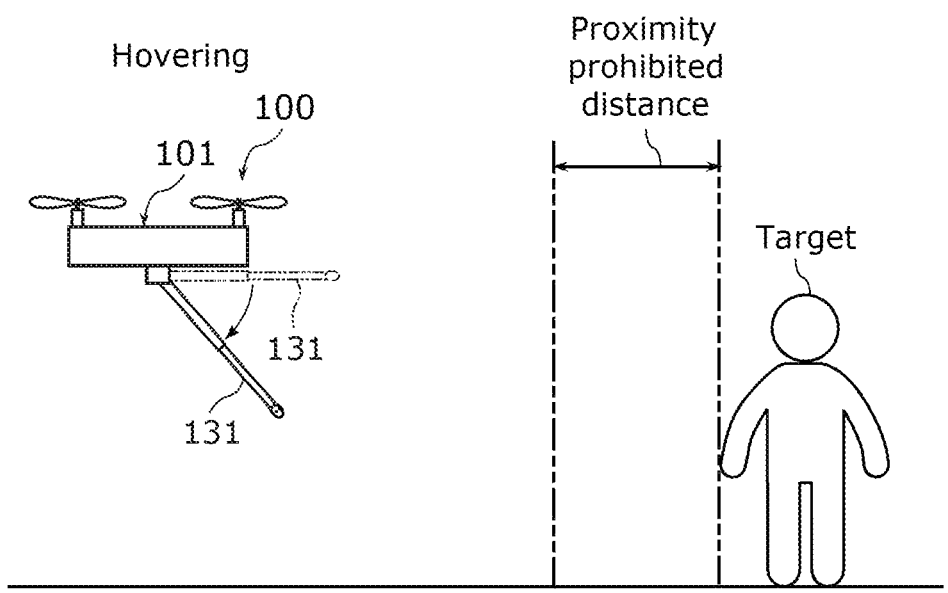
FIG. 5 schematically illustrates an example of a state where the unmanned aerial vehicle according to the embodiment changes an orientation of the arm of an actuator while hovering.

As illustrated in FIG. 5, when extending arm 131 of actuator 130, controller 150 may change the orientation of arm 131 of actuator 130 while directing arm 131 of actuator 130 toward the target. FIG. 5 schematically illustrates an example of the state where the orientation of arm 131 of actuator 130 is changed while unmanned aerial vehicle 100 according to the embodiment is hovering. By doing so, the sound pickup quality of the sound emitted by the target can be improved.

When the identified sound pickup quality is higher than or equal to the goal quality (Yes in S14), sound pickup unit 112 causes microphone 111 to start picking up sound, so that microphone 111 picks up the sound for a certain period of time (S20).

When the identified sound pickup quality is lower than the goal quality (No in S14), sound pickup unit 112 outputs information indicating a determination result (result indicating that the identified sound pickup quality is lower than the goal quality) to controller 150. Controller 150 determines whether or not arm 131 of actuator 130 has reached the extendable limit based on the information indicating the determination result (S15). Whether or not arm 131 of actuator 130 has reached the extendable limit may be determined based on the driving amount of motor 132 or the like, or may be determined by detection with sensor 120.

When arm 131 of actuator 130 has not reached the extendable limit (No in S15), that is, when arm 131 can be further extended, controller 150 returns to the process in step S13 and controls actuator 130 such that arm 131 of actuator 130 is extended. For example, in step S13, controller 150 determines the extension amount of actuator 130 based on the identified sound pickup quality, and controls the extension of actuator 130 according to the determined extension amount.

When arm 131 of actuator 130 has reached the extendable limit (Yes in S15), that is, when arm 131 cannot be extended any further, controller 150 ends the process in step S15 (S16).

However, if no change is made here, the sound pickup quality of microphone 111 is poor. Accordingly, as illustrated in FIG. 1, FIG. 3B and FIG. 4, controller 150 causes unmanned aerial vehicle 100 to move toward a second position which is closer to the target than the first position is, based on the position of the target with respect to unmanned aerial vehicle 100 or the distance from unmanned aerial vehicle 100 to the target (S17). Specifically, controller 150 determines the second position according to the position of the target with respect to unmanned aerial vehicle 100 or the distance from unmanned aerial vehicle 100 to the target which are already calculated from the data obtained from sensor 120. The second position is the position where unmanned aerial vehicle 100 and the target have a predetermined positional relationship. Controller 150 controls the movement of unmanned aerial vehicle 100 by generating a movement control signal based on the determined second position and outputting the generated movement control signal to driver 140. Controller 150 controls the flight of unmanned aerial vehicle 100 such that unmanned aerial vehicle 100 moves from the first position to the second position. When unmanned aerial vehicle 100 moves from the first position to the second position, unmanned aerial vehicle 100 moves with arm 131 of actuator 130 being extended. For this reason, when unmanned aerial vehicle 100 moves from the first position to the second position, controller 150 controls driver 140 such that unmanned aerial vehicle 100 moves from the first position to the second position under the movement condition or the attitude condition of unmanned aerial vehicle 100 corresponding to the extension amount of actuator 130. For example, the moving speed at this time is slower than the moving speed when unmanned aerial vehicle 100 moves toward the first position.

Moreover, controller 150 determines whether or not unmanned aerial vehicle 100 has reached the boundary of the proximity prohibited area (S18). When at least part of unmanned aerial vehicle 100 has not reached the boundary of the proximity prohibited area (No in S18), controller 150 continues the movement in S17.

When unmanned aerial vehicle 100 entirely reaches the boundary of the proximity prohibited area (Yes in S18), controller 150 causes microphone 111 to start picking up sound via sound pickup unit 112. Specifically, controller 150 generates a sound pickup signal for causing microphone 111 to start picking up sound, and outputs the generated sound pickup signal to sound pickup unit 112. When sound pickup unit 112 obtains the sound pickup signal, sound pickup unit 112 causes microphone 111 to start picking up sound based on the sound pickup signal, so that microphone 111 picks up the sound for a certain period of time. The sound pickup performed by microphone 111 here is a sound pickup for checking the sound pickup quality of the sound emitted by the target. Microphone 111 starts picking up sound, generates sound data indicating the sound emitted by the target, and outputs the generated sound data to sound pickup unit 112. Sound pickup unit 112 identifies the sound pickup quality of the obtained sound data, compares the identified sound pickup quality with the goal quality, and determines whether or not the identified sound pickup quality satisfies the goal quality (S19).

When the identified sound pickup quality is higher than or equal to the goal quality (Yes in S19), sound pickup unit 112 causes microphone 111 to start picking up sound so that microphone 111 picks up the sound for a certain period of time (S20). In steps S14 and S19, sound pickup unit 112 causes microphone 111 to start picking up sound in order to check the sound pickup quality. In step S20, sound pickup unit 112 causes microphone 111 to start picking up sound in order to pick up the sound which is emitted by the target and which has a quality higher than or equal to the goal quality. Then, unmanned aerial vehicle 100 ends the process.

When the identified sound pickup quality is lower than the goal quality (No in S19), controller 150 instructs the target to increase the sound volume (S21). For example, when the target is a person and unmanned aerial vehicle 100 includes a microphone, controller 150 may give an instruction prompting to increase the sound volume by voice, such as "please speak a little louder". Moreover, when unmanned aerial vehicle 100 includes a display unit, such as a monitor, controller 150 may give an instruction prompting to increase the sound volume by displaying, for example, "please speak a little louder" on the display unit. Moreover, for example, when the target is a device, an instruction prompting to increase the sound volume may be given to the device by transmitting a control command prompting the device to increase the volume via communication unit 170. By doing so, the target is capable of emitting a louder sound. Unmanned aerial vehicle 100 then ends the process.

Advantageous Effects

As described above, unmanned aerial vehicle 100, the control method, and the non-transitory computer-readable recording medium having program recorded thereon determine the first position according to information which indicates at least one of the position of the target with respect to unmanned aerial vehicle 100 or the distance from unmanned aerial vehicle 100 to the target which are obtained by controller 150. The first position is the position where unmanned aerial vehicle 100 and the target have a predetermined positional relationship. Controller 150 causes unmanned aerial vehicle 100 to move to the determined first position, hover at the first position, and then extend arm 131 of actuator 130 toward the target. Accordingly, while unmanned aerial vehicle 100 is moving, the center of the gravity of unmanned aerial vehicle 100 is less likely to deviate from the center of unmanned aerial vehicle 100 due to the weight of actuator 130. Hence, the flight performance of unmanned aerial vehicle 100 is unlikely to be reduced during the movement.

Moreover, after arriving at the first position (while hovering), unmanned aerial vehicle 100 is capable of moving microphone 111 away from body 101 of unmanned aerial vehicle 100 by extending arm 131 of actuator 130, and also is capable of bringing microphone 111 closer to the target. Accordingly, microphone 111 is capable of picking up the sound emitted by the target while the influence of the sound emitted by body 101 is being reduced. As a result, microphone 111 is capable of ensuring the sound pickup quality higher than or equal to the goal quality.

(Other Variations)

Although the unmanned aerial vehicle, the control method, and the recording medium according to the embodiment of the present disclosure have been described above, the embodiment of the present disclosure is not limited to the above-described embodiment.

For example, in the unmanned aerial vehicle, the control method and the recording medium according to the embodiment of the present disclosure, the unmanned aerial vehicle may include a plurality of sensors, may include a human detection sensor, and may include a position sensor.

Moreover, in the unmanned aerial vehicle, the control method, and the recording medium according to the embodiment of the present disclosure, the sound pickup unit may be included in the controller, and the processor of the sound pickup unit and the processor of the controller may be one processor.

Moreover, in the unmanned aerial vehicle, the control method, and the recording medium according to the embodiment of the present disclosure, when the sound pickup quality is lower than the goal quality after the unmanned aerial vehicle moves to the second position, the controller may further determine a third position. The third position is outside the proximity prohibited area. The controller may move the unmanned aerial vehicle to the third position.

Moreover, in the unmanned aerial vehicle, the control method, and the recording medium according to the embodiment of the present disclosure, the sound pickup unit may cause the microphone to pick up sound while the arm of the actuator is extended. In this case, the controller may stop the extension of the arm of the actuator when the sound pickup quality becomes higher than or equal to the goal quality. Accordingly, since the amount of extension of the arm of the actuator can be set appropriately, it is possible to reduce the deviation of the center of gravity of the unmanned aerial vehicle caused by the actuator.

Moreover, in the unmanned aerial vehicle, the control method, and the recording medium according to the embodiment of the present disclosure, the microphone of the arm of the actuator is directed toward the target. By adjusting the altitude of the unmanned aerial vehicle, the microphone of the arm of the actuator may be directed toward the target.

Moreover, in the unmanned aerial vehicle, the control method, and the recording medium according to the embodiment of the present disclosure, the arm of the actuator does not have to be extendable when the unmanned aerial vehicle moves. Further, after extending the arm of the actuator, the controller may limit the speed at which the unmanned aerial vehicle moves or limit the attitude of the body of the unmanned aerial vehicle at which the unmanned aerial vehicle moves. In addition, when the arm of the actuator is extended at the time of movement of the unmanned aerial vehicle, the controller may start the movement of the unmanned aerial vehicle after the second arm is housed in the first arm (after the arm is contracted). Thus, in the unmanned aerial vehicle, the control method and the recording medium, the operation of the unmanned aerial vehicle may be restricted when the unmanned aerial vehicle is operated under the movement or attitude conditions.

Moreover, in the unmanned aerial vehicle, the control method, and the recording medium according to the embodiment of the present disclosure, the processing performed by the controller may be performed by the processor.

Moreover, in the unmanned aerial vehicle, the control method, and the recording medium according to the embodiment of the present disclosure, information indicating the proximity prohibited distance may be stored in advance in the storage, and may be stored in the storage via the communication unit from an external device, such as a remote control device.

Moreover, in the unmanned aerial vehicle, the control method, and the recording medium according to the embodiment of the present disclosure, the second position may be set outside the proximity prohibited area defined by the proximity prohibited distance centered on the target.

Moreover, each processing unit included in the unmanned aerial vehicle according to the above embodiment is typically implemented as a Large Scale Integration (LSI) circuit which is an integrated circuit. These processing units may be individually configured as single chips or may be configured so that a part or all of the processing units are included in a single chip.

Furthermore, the method of circuit integration is not limited to LSIs, and implementation through a dedicated circuit or a general-purpose processor is also possible. A field programmable gate array (FPGA) that can be programmed after the LSI is manufactured, or a reconfigurable processor that can reconfigure the connection and settings of the circuit cells inside the LSI may be used.

Note that, in the above embodiment, each structural element may be configured by dedicated hardware or may be realized by executing a software program suitable for each structural element. Each structural element may be realized by a program execution unit, such as a central processing unit (CPU) or a processor, reading and executing a software program recorded on a recording medium, such as a hard disk or a semiconductor memory.

Moreover, all numerical figures used in the forgoing description are merely examples for describing the present disclosure in specific terms, and thus the embodiment in the present disclosure is not limited to the illustrated numerical figures.

Furthermore, the separation of the function blocks in the block diagrams is merely an example, and plural function blocks may be implemented as a single function block, a single function block may be separated into plural function blocks, or part of functions of a function block may be transferred to another function block. Furthermore, the functions of function blocks having similar functions may be processed, in parallel or in a time division manner, by a single hardware or software.

Furthermore, the sequence in which the above-described steps included in the flowcharts are executed is given as an example to describe the present disclosure in specific terms, and thus other sequences are possible. Part of the above-described steps may be executed simultaneously (in parallel) with another step.

The unmanned aerial vehicle, the control method, and the recording medium according to one or more aspects have been described above based on the embodiment, but the embodiment of the present disclosure is not limited to the plurality of aspects. Various modifications to the present embodiment that can be conceived by those skilled in the art, and forms configured by combining the structural elements in different embodiments without departing from the teachings of the present disclosure are included in the scope of one or more of the aspects.

INDUSTRIAL APPLICABILITY

The present disclosure can be used for an unmanned aerial vehicle and the like, and can be applied to watching systems, communication robots that interact with users, etc.

The invention claimed is:

1. An unmanned aerial vehicle, comprising:
a body;
a microphone which picks up a sound emitted by a target;
an actuator which extends in a predetermined direction to change a position of the microphone, wherein an end of the actuator is rotatably mounted to a bottom surface of the body to be changeable in the predetermined direction in a space where the unmanned aerial vehicle flies, and wherein the actuator is positioned so that the predetermined direction is along the bottom surface of the body; and
a processor,
wherein the processor obtains positional relationship information which indicates at least one of a position of the target or a distance from the unmanned aerial vehicle to the target, and
the processor performs (i) control for causing the unmanned aerial vehicle to move to a first position based on the positional relationship information, and extending the actuator after the unmanned aerial vehicle moves to the first position, the first position being a position at which the unmanned aerial vehicle and the target have a predetermined positional relationship, and (ii) control for inclining, toward the target, the actuator positioned so that the predetermined direction is along the bottom surface of the body to change the predetermined direction in the space.

2. The unmanned aerial vehicle according to claim 1, wherein the processor performs control for extending the actuator to an extent that maintains at least a predetermined distance between the target and one of the microphone and the actuator.

3. The unmanned aerial vehicle according to claim 1, wherein the processor causes the unmanned aerial vehicle to move away from the target according to an extension of the actuator.

4. The unmanned aerial vehicle according to claim 1, wherein the processor identifies a sound pickup quality by using sound data indicating the sound emitted by the target and picked up by the microphone, the sound pickup quality being a quality of the sound picked up by the microphone, and
the processor performs control for extending the actuator based on the sound pickup quality identified.

5. The unmanned aerial vehicle according to claim 4,
wherein the processor controls an amount of extension of the actuator based on the sound pickup quality identified.

6. The unmanned aerial vehicle according to claim 4,
wherein, when the sound pickup quality identified is lower than a goal quality, the processor causes the unmanned aerial vehicle to move to a second position under one of a movement condition and an attitude condition of the unmanned aerial vehicle corresponding to an extension state of the actuator, the second position being a position closer to the target than the first position is.

7. The unmanned aerial vehicle according to claim 4,
wherein the target is a person,
wherein the unmanned aerial vehicle further comprises a loudspeaker, and
wherein the processor causes the loudspeaker to output a voice instructing the person to increase a sound volume when the sound pickup quality identified is lower than the goal quality.

8. The unmanned aerial vehicle according to claim 4,
wherein the target is a person,
the unmanned aerial vehicle further comprises a monitor, and
the processor causes the monitor to output a message instructing the person to increase a sound volume when the sound pickup quality identified is lower than the goal quality.

9. The unmanned aerial vehicle according to claim 4,
wherein the target is a device which emits sound,
the unmanned aerial vehicle further comprises a communication unit, and
the processor causes the communication unit to execute processing of transmitting, to the device, a command prompting the device to increase the sound volume when the sound pickup quality identified is lower than the goal quality.

10. The unmanned aerial vehicle according to claim 1, further comprising:
an image sensor which captures an image of the target,
wherein the processor obtains the positional relationship information by using image data captured by the image sensor, the image data including the image of the target.

11. The unmanned aerial vehicle according to claim 1, further comprising:
a ranging sensor which measures a distance to the target,
wherein the processor obtains the positional relationship information by using distance data which indicates the distance to the target measured by the ranging sensor.

12. The unmanned aerial vehicle according to claim 1,
wherein the actuator further includes an arm that extends in the predetermined direction,
one end of the arm is mounted rotatably to the bottom surface of the body so that the predetermined direction is changeable,
the other end of the arm is mounted with the microphone,
the arm is positioned lower than the bottom surface of the body so that the predetermined direction is along the bottom surface of the body,
the control for extending is control for extending the arm, and
the control for inclining is control for inclining the arm toward the target.

13. A control method for controlling an unmanned aerial vehicle including
a body,
a microphone which picks up a sound emitted by a target,
an actuator which extends in a predetermined direction to change a position of the microphone, and
a processor,
wherein an end of the actuator is rotatably mounted to a bottom surface of the body to be changeable in the predetermined direction in a space where the unmanned aerial vehicle flies, and wherein the actuator is positioned so that the predetermined direction is along the bottom surface of the body, the microphone picking up a sound emitted by a target, the actuator extending in a predetermined direction to change a position of the microphone, the method being performed by a processor, the method comprising:
obtaining positional relationship information which indicates at least one of a position of the target or a distance from the unmanned aerial vehicle to the target, and
performing (i) control for causing the unmanned aerial vehicle to move to a first position based on the positional relationship information, and extending the actuator after the unmanned aerial vehicle moves to the first position, the first position being a position at which the unmanned aerial vehicle and the target have a predetermined positional relationship, and (ii) control for inclining, toward the target, the actuator positioned so that the predetermined direction is along the bottom surface of the body to change the predetermined direction in the space.

14. A non-transitory computer-readable recording medium having a program recorded thereon for causing the processor to execute the control method according to claim 13.

* * * * *